(12) United States Patent
Iida

(10) Patent No.: US 9,252,622 B2
(45) Date of Patent: Feb. 2, 2016

(54) CHARGING APPARATUS, POWER STORAGE APPARATUS, AND POWER SOURCE APPARATUS

(75) Inventor: Takashi Iida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 273 days.

(21) Appl. No.: 13/824,922

(22) PCT Filed: Dec. 2, 2011

(86) PCT No.: PCT/JP2011/077910
§ 371 (c)(1),
(2), (4) Date: Mar. 18, 2013

(87) PCT Pub. No.: WO2012/081423
PCT Pub. Date: Jun. 21, 2012

(65) Prior Publication Data
US 2013/0249483 A1 Sep. 26, 2013

(30) Foreign Application Priority Data
Dec. 13, 2010 (JP) ................. 2010-276546

(51) Int. Cl.
*H02J 7/14* (2006.01)
*B60L 11/18* (2006.01)
(Continued)

(52) U.S. Cl.
CPC .............. *H02J 7/007* (2013.01); *B60L 3/0046* (2013.01); *B60L 3/12* (2013.01); *B60L 11/1861* (2013.01);
(Continued)

(58) Field of Classification Search
CPC .......... Y02T 10/7005; H02J 7/00; H02J 7/02; H02J 7/007; H01M 10/44; H01M 10/48; B60L 11/18
USPC .................................... 320/104, 109
See application file for complete search history.

(56) References Cited

U.S. PATENT DOCUMENTS 6,483,272 B1 * 11/2002 Terada et al. ................. 320/103
8,963,504 B2 * 2/2015 Kuroda et al. ................ 320/137
(Continued)

FOREIGN PATENT DOCUMENTS

JP H10-215525 A 8/1998
JP 2008-136291 A 6/2008
(Continued)

OTHER PUBLICATIONS

International Search Report issued in PCT/JP2011/077910, mailed on Feb. 28, 2012.

*Primary Examiner* — M'Baye Diao
(74) *Attorney, Agent, or Firm* — McDermott Will & Emery LLP

(57) ABSTRACT

A charging apparatus comprises an estimator unit for estimating the habitual usage start time of a secondary cell on the basis of the usage history of the secondary cell, an allowable charging time calculator unit for calculating the period of time from the charging start time of the secondary cell to the imminent usage start time as allowable charging time, a necessary charge time calculator unit for calculating the charging time necessary to fully charge the secondary cell as necessary charging time, and a charger unit for charging the secondary cell under degradation-suppression charging conditions when the allowable charging time exceeds the necessary charge time. Under the degradation-suppression charging conditions, the charging apparatus performs temporary charging suspension during charging, and charges the secondary cell so that full charge is reached within the allowable charging time.

8 Claims, 4 Drawing Sheets

(51) Int. Cl.
   *H02J 7/00* (2006.01)
   *H01M 10/44* (2006.01)
   *H02J 7/04* (2006.01)
   *B60L 3/00* (2006.01)
   *B60L 3/12* (2006.01)

(52) U.S. Cl.
   CPC ............... *H01M 10/44* (2013.01); *H02J 7/041* (2013.01); *B60L 2210/10* (2013.01); *B60L 2210/40* (2013.01); *B60L 2230/22* (2013.01); *B60L 2240/525* (2013.01); *B60L 2240/545* (2013.01); *B60L 2240/547* (2013.01); *B60L 2240/662* (2013.01); *B60L 2240/80* (2013.01); *B60L 2260/44* (2013.01); *B60L 2260/58* (2013.01); *H02J 7/047* (2013.01); *Y02T 10/7005* (2013.01); *Y02T 10/705* (2013.01); *Y02T 10/7044* (2013.01); *Y02T 10/7088* (2013.01); *Y02T 10/7216* (2013.01); *Y02T 10/7241* (2013.01); *Y02T 10/7291* (2013.01); *Y02T 90/12* (2013.01); *Y02T 90/16* (2013.01)

(56) References Cited

U.S. PATENT DOCUMENTS

| | | | |
|---|---|---|---|
| 2010/0097036 | A1 | 4/2010 | Wakayama |
| 2010/0164439 | A1 | 7/2010 | Ido |
| 2010/0217485 | A1 | 8/2010 | Ichishi |
| 2010/0259219 | A1 | 10/2010 | Kurimoto et al. |
| 2011/0057613 | A1* | 3/2011 | Taguchi et al. ............... 320/109 |
| 2011/0193532 | A1* | 8/2011 | Iwanaga ............... B60K 6/445 320/163 |
| 2011/0320082 | A1* | 12/2011 | Ishishita ..................... 701/22 |
| 2012/0226406 | A1* | 9/2012 | Kaita et al. .................... 701/22 |

FOREIGN PATENT DOCUMENTS

| | | |
|---|---|---|
| JP | 2008-204811 A | 9/2008 |
| JP | 2009-022061 A | 1/2009 |
| JP | 2009136109 A | 6/2009 |
| JP | 2010-098897 A | 4/2010 |
| JP | 2010154646 A | 7/2010 |
| JP | 2010-183789 A | 8/2010 |
| WO | WO-2009090913 A1 | 7/2009 |
| WO | 2010/096502 A1 | 8/2010 |

* cited by examiner

CHARGING APPARATUS, POWER STORAGE APPARATUS, AND POWER SOURCE APPARATUS

RELATED APPLICATIONS

This application is the U.S. National Phase under 35 U.S.C. §371 of International Application No. PCT/US2011/077910, filed on Dec. 2, 2011, which in turn claims priority to Japanese Patent Application No. 2010-276546, filed on Dec. 13, 2010, the disclosures of which Applications are incorporated by reference herein.

TECHNICAL FIELD

The present invention relates to a charge apparatus that charges a secondary battery, a power storage apparatus and a power source apparatus.

BACKGROUND ART

Conventionally, secondary batteries such as a lithium-ion battery and the like are widely used in electric cars and the like. A secondary battery is suitably rechargeable by a charge apparatus and usable repeatedly, accordingly, is excellent in economy and the like.

Meanwhile, as for a conventional general charge apparatus, to bring the charge apparatus to a full charge state as soon as possible, a charge of a secondary battery is performed with no suspension immediately after the secondary battery is connected until the full charge is achieved. Besides, a patent document 1 and a patent document 2 disclose apparatuses that perform a charge of a secondary battery considering temperature for the purpose of performing the charge and the like in a suitable environment.

CITATION LIST

Patent Literature

PLT1: JP-A-2010-183789
PLT1: JP-A-2010-98897

SUMMARY OF INVENTION

Technical Problem

Meanwhile, if a secondary battery is charged in a high temperature environment, dissolution reaction of a positive substance and decomposition reaction of an electrolyte in the battery are accelerated, and the secondary battery easily deteriorates. Because of this, to prevent the life of the secondary battery from becoming short, it is conceivable to take measures such that a temporary charge suspension is performed during the charge to prevent the secondary battery from rising to a high temperature as long as it is possible.

Meanwhile, the apparatuses disclosed in the patent document 1 and the patent document 2 charge the secondary battery considering temperature, however, are not intended for the purpose of alleviating deterioration due to the charge in a high temperature environment. Besides, the apparatus disclosed in the patent document 1 does not consider a timing when the battery is used next. If a temporary suspension is performed without considering this timing, a sufficient charge is not performed by a time when the secondary battery is used, and it is highly likely that trouble occurs in the use of the secondary battery. Besides, in the apparatus disclosed in the patent document 2, it is necessary for a user to input a drive start time, which imposes a burden on the user.

In light of the above problems, it is an object of the present invention to provide a charge apparatus that is able to charge a secondary battery alleviating deterioration and to avoid a situation, in which the secondary battery is not sufficiently charged by the next use time, without imposing a burden on a user.

Solution to Problem

A charge apparatus according to the present disclosure is a charge apparatus that charges a secondary battery, the charge apparatus has a structure that includes: an estimation portion that estimates a use start time of the secondary battery based on a use history of the secondary battery; a charge allowable time calculation portion that calculates a time period from a charge start time of the secondary battery to a nearest use start time as a charge allowable time period; a necessary charge time calculation portion that calculates a necessary charge time period necessary to fully charge the secondary battery; and a charge execution portion that performs a temporary suspension of the charge during the charge and charges the secondary battery such that the secondary battery is fully charged within the charge allowable time period when the charge allowable time period exceeds the necessary charge time period.

Besides, a power storage apparatus according to the present disclosure has a structure that includes: the secondary battery that is charged by the charge apparatus which has the above structure; and a charge/discharge control unit that performs control of a charge or a discharge of the secondary battery.

Besides, a power source apparatus according to the present disclosure has a structure that includes: the power storage apparatus; and a power conversion apparatus that performs power conversion between the secondary batter and an external apparatus or between the secondary battery and a power system under the control by the charge/discharge control unit, wherein the power source apparatus is connectable to the external apparatus or the power system.

Advantageous Effects of Invention

In the charge apparatus according to the present invention, it is possible to charge a secondary battery alleviating deterioration and to avoid a situation, in which the secondary battery is not sufficiently charged by the next use time, without imposing a burden on a user.

DESCRIPTION OF EMBODIMENTS

Embodiments of the present invention are described hereinafter with reference to the drawings. As a charge apparatus according to the present invention, here, a charge apparatus that charges a secondary battery mounted in cars such as an electric car, a hybrid car and the like is described as an example.

1. First Embodiment

[Structure of Charge Apparatus and Overview of Use Form]

Figure 1:
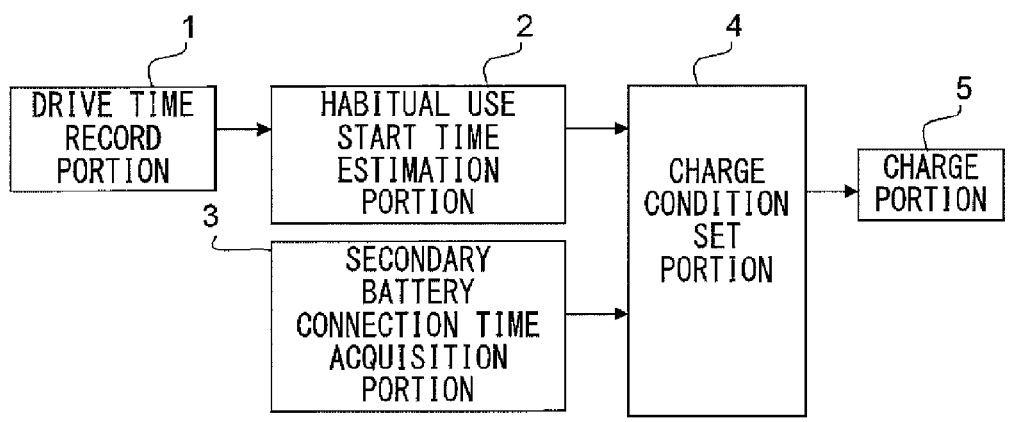
FIG. 1 is a block diagram showing a structure of a charge apparatus according to an embodiment of the present invention.

FIG. 1 shows a structure of a charge apparatus according to an embodiment (first embodiment) of the present invention. A charge apparatus 9 shown in FIG. 1 is a charge apparatus that charges a secondary battery mounted in cars such as an electric car, a hybrid car and the like, and includes: a drive time record portion 1; a habitual use start time estimation portion 2; a secondary battery connection time acquisition portion 3; a charge condition set portion 4; and a charge portion 5. Meanwhile, hereinafter, the term "secondary battery" refers to a charge target of the charge apparatus 9. Besides, the term "car" refers to a vehicle in which the secondary battery is mounted.

The charge apparatus 9 may be mounted in a car or may not be mounted in a car. In the case where the charge apparatus 9 is mounted in a car, a charge is performed by the charge apparatus 9 with the secondary battery mounted in the car. On the other hand, in the case where the charge apparatus 9 is not mounted in a car, a charge may be performed by the charge apparatus 9 after the secondary battery is demounted from the car.

<Drive Time Record Portion>

The drive time record portion 1 records a drive start time and a drive end time of a car in year, month, date and time (time units) and outputs the recorded drive time to the habitual use start time estimation portion 2. The drive time record portion 1 determines a drive time based on a state of an ignition key of the car, a state of a car navigation system mounted in the car, a residual amount of the secondary battery and the like.

In a case where the drive time is determined based on the state of the ignition key, a time when the ignition key changes from OFF to ON is used as the drive start time, and a time when the ignition key changes from ON to OFF is used as the drive end time.

In a case where the drive time is determined based on the state of the car navigation system, a time when the car navigation system starts to operate is used as the drive start time, and a time when the car navigation system stops is used as the drive end time.

In a case where the drive time is determined based on the residual amount of the secondary battery, a time when a decrease amount per unit time of the residual amount of the secondary battery exceeds a fixed threshold value is used as the drive start time. Besides, when the residual amount of the secondary battery does not change during a predetermined time period after the start of the drive, a time when the predetermined time period elapses is used as the drive end time.

It is desirable to store sets of the drive start time and the drive end time obtained as described above for one year in the drive time record portion 1.

<Habitual Use Start Time Estimation Portion>

Based on the drive start time and drive end time received from the drive time record portion 1, the habitual use start time estimation portion 2 estimates a time (habitual use start time) $T_{EF}$ when the use (which synchronizes with the car drive in the present embodiment) of the secondary battery is habitually started and outputs the estimated habitual use start time $T_{EF}$ to the charge condition set portion 4.

The habitual use start time estimation portion 2 estimates the habitual use start time in a daily unit, a weekly unit or a monthly unit. The habitual use start time in the daily unit is a drive start time that is obtained, for example, by comparing drive start times for days with one another and selecting one which matches for K days or more of one week. K is a fixed value experimentally obtained. Besides, the habitual use start time in the weekly unit is a drive start time that is obtained, for example, by comparing drive start times for specific days of weeks with one another and selecting one which matches for L days or more of one month. L is a fixed value experimentally obtained. Besides, the habitual use start time in the monthly unit is a drive start time that is obtained, for example, by comparing drive start times for specific dates with one another and selecting one which matches for M days or more of a year. M is a fixed value experimentally obtained.

Besides, in a case where an interval between a drive end time and the following drive start time is smaller than a predetermined value set beforehand, it may be determined that only an idling stop and the like are executed and the drive is continuous, and the drive start time in the case may be removed from the materials for the determination by the habitual use start time estimation portion 2. Meanwhile, such a process may not be performed, and the drive time record portion 1 may not record the drive end time but may record the drive start time only.

<Secondary Battery Connection Time Acquisition Portion>

At a time point (i.e., a time point when a charge becomes possible) when the charge apparatus 9 is connected to a power source (e.g., a commercial power source) and a battery pack including a secondary battery is connected to the charge apparatus 9, the secondary battery connection time acquisition portion 3 outputs information of the time (secondary battery connection time) $T_{SI}$ to the charge condition set portion 4. Meanwhile, the secondary battery connection time $T_{SI}$ is ragardable as a time when the charge of the secondary battery by the charge apparatus 9 becomes possible.

<Charge Condition Set Portion>

As described above, the charge condition set portion 4 receives the habitual use start time $T_{EF}$ from the habitual use start time estimation portion 2 and the secondary battery connection time $T_{SI}$ from the secondary battery connection time acquisition portion 3. At a time point when the secondary battery connection time $T_{SI}$ is input, the charge condition set portion 4 sets a charge condition of the secondary battery based on each piece of input information and outputs the charge condition to the charge portion 5.

Figure 2:
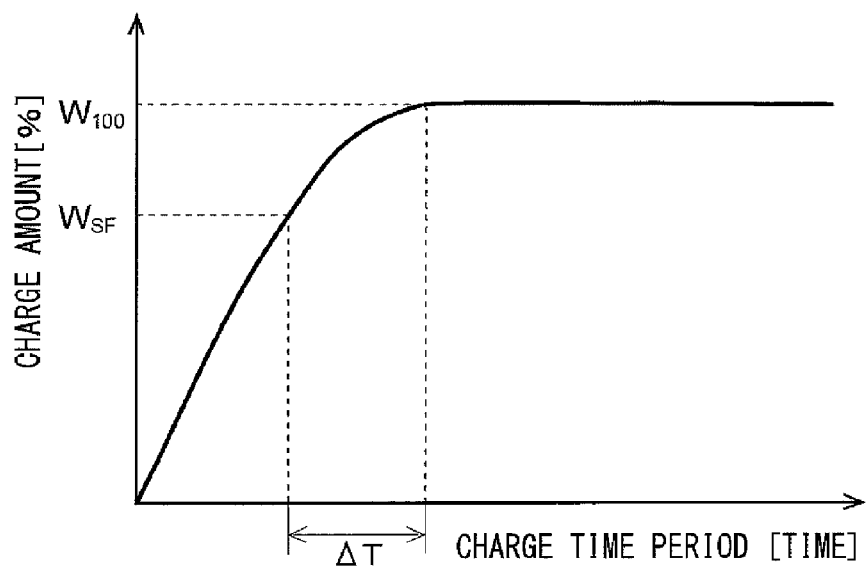
FIG. 2 is a view showing a charge characteristic that indicates a relationship between a charge time period and a charge amount of a secondary battery.
Figure 3:
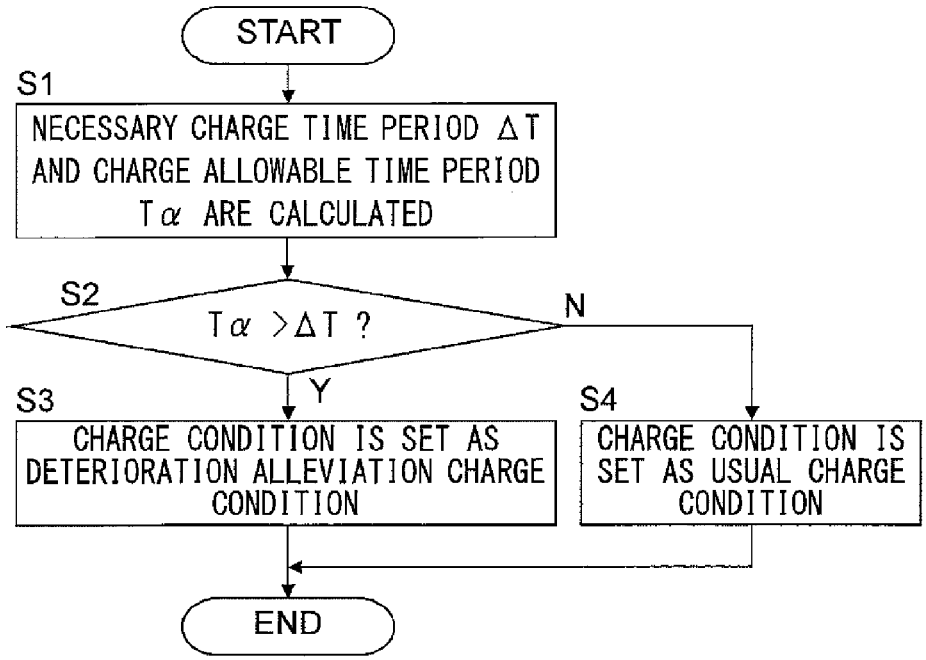
FIG. 3 is a flow chart related to setting of a charge condition.

Here, in the present embodiment, it is assumed that the battery pack connected to the charge apparatus 9 includes a memory and a charge characteristic (see FIG. 2) showing a relationship between a charge time period and a charge amount of the secondary battery is recorded in the memory beforehand. The charge condition set portion 4 reads out data of the charge characteristic from the memory and sets the charge condition. An example of a method for setting the charge condition is described hereinafter with reference to a flow chart shown in FIG. 3.

Based on the charge characteristic data of the secondary battery, the charge condition set portion 4 calculates a time period (necessary charge time period) ΔT that is necessary to charge the secondary battery from a current charge amount $W_{SF}$ to a full charge amount $W_{100}$. Besides, further, the charge condition set portion 4 calculates a time period (charge allowable time period) Tα from the secondary battery connection time $T_{SI}$ to the nearest habitual use start time $T_{EF}$ (step S1).

Meanwhile, in the charge apparatus 9, the charge condition is set immediately when the charge becomes possible and the charge is started. Because of this, the secondary battery connection time $T_{SI}$ is regardable as the same as the time (charge start time) when the charge is started.

Next, the charge condition set portion 4 determines whether the charge allowable time period Tα is in excess of the necessary charge time period ΔT (step S2). And, in a case where the charge allowable time period Tα is in excess of the necessary charge time period ΔT (Y in the step S2), it is sayable that there is a timewise leeway (hereinafter, there is a case of being called a "timewise leeway for charge") for achieving the full charge by a time when the next use of the secondary battery is expected to start. In this case, the charge condition set portion 4 sets the charge condition as a deterioration alleviation charge condition (step S3).

This deterioration alleviation charge condition is a charge condition for performing a temporary suspension of the charge (operation for stopping the charge for a predetermined period (temporary suspension period)) every time a temperature of the secondary battery reaches a charge limit temperature $C_T$ during the charge. According to this charge condition, during the temporary suspension, it is possible to stop a temperature rise of the secondary battery due to the charge and to lower the temperature of the secondary battery by means of heat radiation. As a result of this, compared with a case where the temporary suspension is not performed, it is possible to charge the secondary battery without incurring a high temperature and to alleviate deterioration of the secondary battery.

Meanwhile, it is possible to decide the charge limit temperature $C_T$ (threshold value set beforehand) by means of various methods using various experimental results and the like such that the secondary battery is fully charged within at least the charge allowable time period Tα. As an example, it is possible to calculate the charge limit temperature $C_T$ by using the following formula (1).

$$CT = C1 - C2 \times (T\alpha - \Delta T) \quad (1)$$

where C1 and C2 are fixed values obtained by experiments and the like.

According to the above formula (1), the charge limit temperature $C_T$ is set in accordance with a difference between the charge allowable time period Tα and the necessary charge time period ΔT. More specifically, the larger the difference between the charge allowable time period Tα and the necessary charge time period ΔT is, that is, the larger the timewise leeway degree of the charge is, the lower the charge limit temperature $C_T$ is set.

Besides, it is possible to set the charge limit temperature $C_T$ at a fixed value in accordance with a characteristic of the secondary battery, for example. Besides, the temporary suspension period of the charge may be set at a predetermined time period, for example, or may be set at a period during which the temperature of the secondary battery decreases to a specific value.

Besides, the deterioration alleviation charge condition may be set such that the sum of the temporary suspension periods of the charge does not exceed the difference between the charge allowable time period Tα and the necessary charge time period ΔT. For example, when the sum of the temporary suspension periods of the charge tries to exceed the difference between the charge allowable time period Tα and the necessary charge time period ΔT, even if the temperature of the secondary battery reaches the charge limit temperature $C_T$ thereafter, the temporary suspension of the charge may not be performed. According to this, it becomes possible to fully charge the secondary battery within the charge allowable time period Tα more surely.

On the other hand, in a case where the charge allowable time period Tα is not in excess of the necessary charge time period ΔT (N in the step S2), the charge condition set portion 4 sets the charge condition as a usual charge condition (step S4). Meanwhile, the usual charge condition is a charge condition under which the temporary suspension is not performed during the charge.

Meanwhile, it is sayable the fact that the charge allowable time period Tα is not in excess of the necessary charge time period ΔT means that there is not a timewise leeway of the charge. Accordingly, in this case, as described above, the charge condition set portion 4 sets the charge condition as the usual charge condition such that the charge proceeds as fast as possible (the charge approaches the full charge as close as possible by a time when the next use of the secondary battery is expected to start).

<Charge Portion>

When the charge condition is set by the charge condition set portion 4, the charge portion 5 immediately starts the charge in accordance with the charge condition. Meanwhile, in the present embodiment, as a basic method for the charge, a method (so-called constant current-voltage charge method) is employed, in which the charge is performed by using a constant current until a voltage of the secondary battery reaches a fixed voltage $V_{CV}$, thereafter, the charge is performed by using a constant voltage, however, another method may be employed.

Besides, the charge portion 5 included a means (e.g., a temperature sensor and the like disposed to contact the secondary battery with the secondary battery connected to the charge apparatus 9) for detecting the temperature of the secondary battery, and is able to monitor the temperature of the secondary battery. Besides, the charge portion 5 includes a means as well for detecting the voltage of the secondary battery, and is able to monitor the voltage of the secondary battery.

Figure 4:
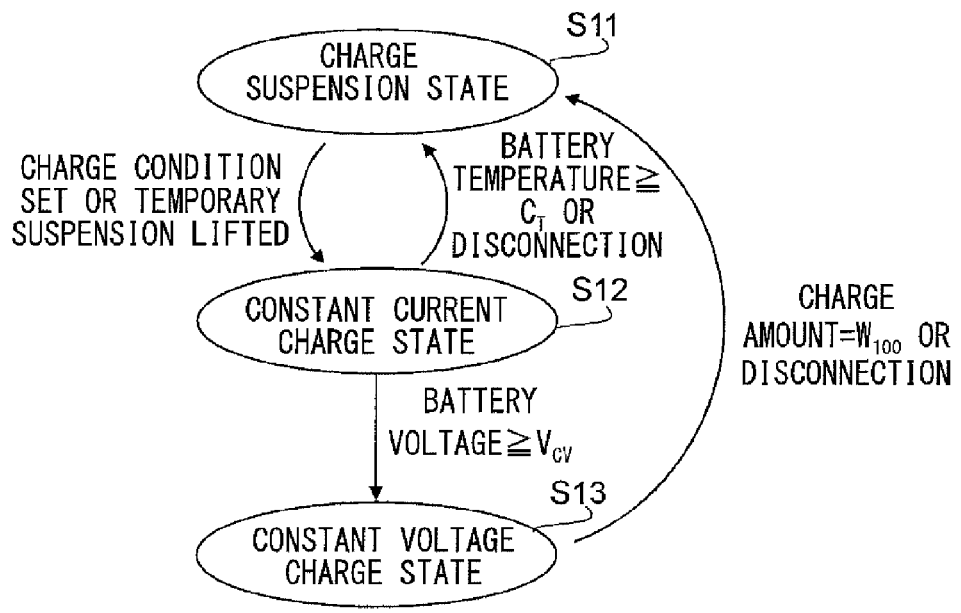
FIG. 4 is a state transition view of a charge portion of a charge apparatus according to an embodiment.

Here, FIG. 4 shows a state transition view of the charge portion 5 in the case where the charge condition is set as the deterioration alleviation charge condition.

First, before the charge apparatus 9 is connected to the battery pack that includes the power source (e.g., the commercial power source) and the secondary battery, the charge portion 5 is in a state where the charge portion 5 suspends the charge (charge suspension state S11).

Next, if the battery pack including the secondary battery is connected to the charge apparatus 9 and the charge condition is set by the charge condition set portion 4, the charge portion 5 shifts to a state where to charge the secondary battery by using the constant current (constant current charge state S12).

Besides, if the temperature of the secondary battery reaches the charge limit temperature $C_T$, the charge portion 5 shifts to the charge suspension state S11 (temporary suspension in this case). And, a predetermined time period elapses after reaching the temporary suspension state, the temporary suspension is lifted and the charge portion 5 shifts to the constant current charge state S12.

Besides, if the charge proceeds thanks to the constant current charge and the voltage of the secondary battery reaches the fixed voltage $V_{CV}$, the charge portion 5 shifts to a state where to charge the secondary battery by using the constant voltage (constant voltage charge state S13). Thereafter, if the charge amount of the secondary battery reaches a full charge amount $W_{100}$, the charge portion 5 shifts to the charge suspension state S11 (charge completion in this case). Meanwhile, in the constant current charge state S12 or the constant voltage charge state S13, in a case where the charge apparatus 9 and the secondary battery are disconnected from each other, the charge portion 5 shifts to the charge suspension state S11 (charge stop in this case).

[Change States of Charge Amount and Temperature of Secondary Battery]

As described above, in the case where there is a timewise leeway of the charge, the charge apparatus 9 charges the secondary battery in accordance with the deterioration alleviation charge condition, accordingly, compared with a charge apparatus of the specifications (hereinafter, called "general specifications" for the sake of convenience) that proceeds with the charge without performing the temporary suspension irrespective of the presence of the timewise leeway of the charge, it is possible to charge the secondary battery without incurring a high temperature.

Figure 5:
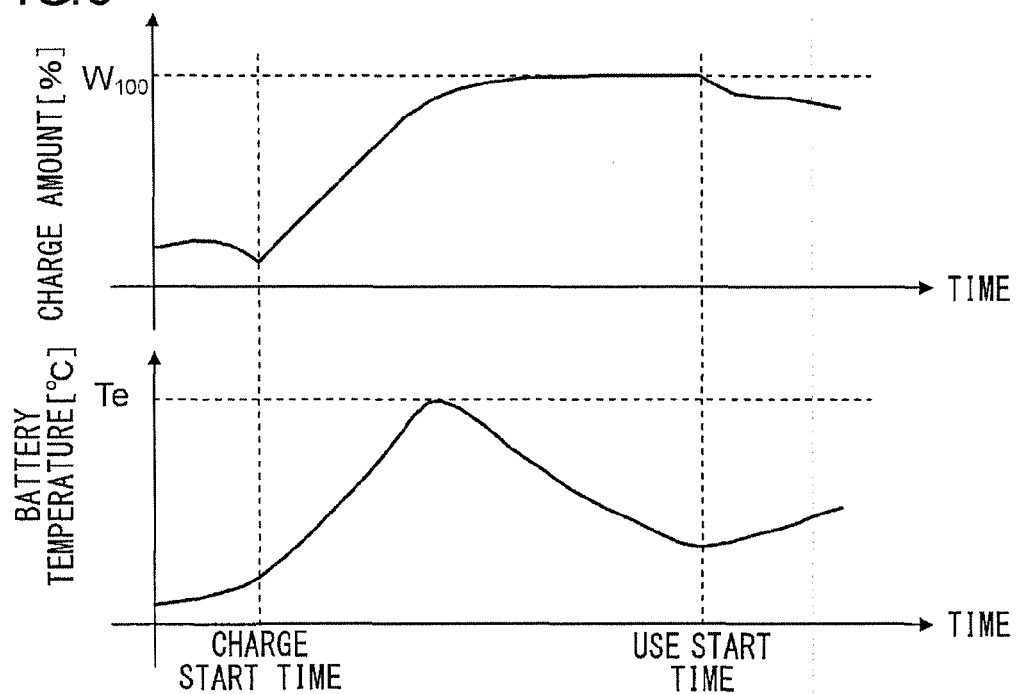
FIG. 5 is a graph showing change states of a charge amount and a temperature of a secondary battery related to a charge apparatus of general specifications.
Figure 6:
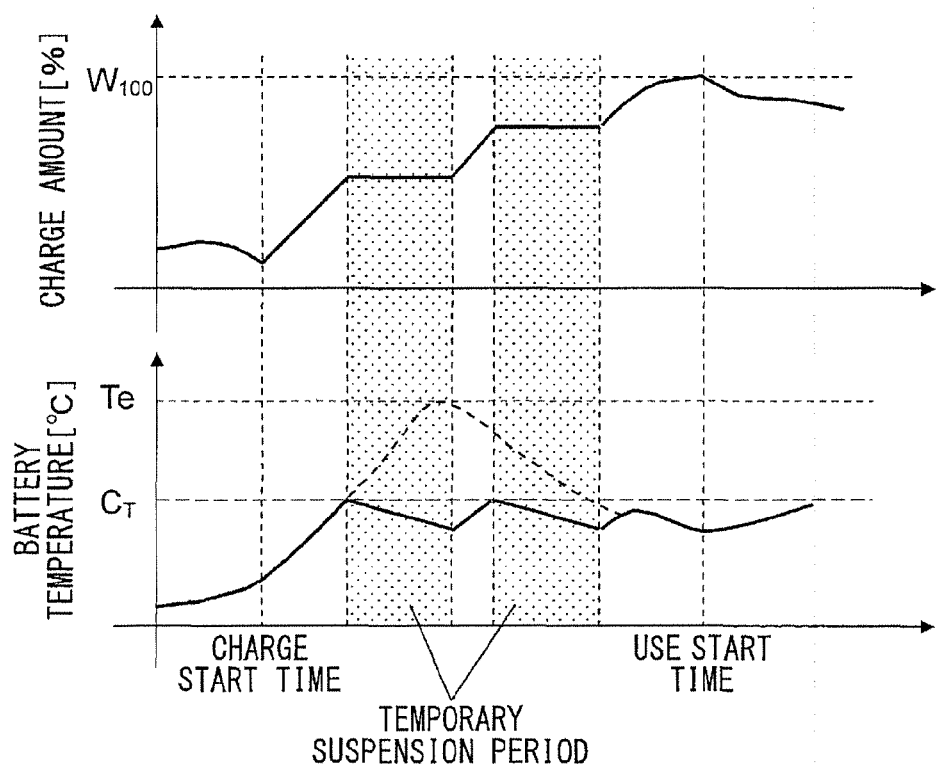
FIG. 6 is a graph showing change states of a charge amount and a temperature of a secondary battery related to a charge apparatus according to an embodiment.

For the sake of easy understanding of this, FIG. 5 and FIG. 6 show graphs that indicate examples of change states of the charge amount and temperature of the secondary battery. FIG. 5 is a graph related to the charge apparatus of the general specifications, while FIG. 6 is a graph related to the charge apparatus 9 according to the present embodiment. A graph shown by a broken line in FIG. 6 indicates a part of the graph shown in FIG. 5 for the sake of easy comparison.

Meanwhile, in both figures, the upper graph indicates the change state of the charge amount, while the lower graph indicates the change state of the temperature of the secondary battery. Besides, except for things related to the charge condition, various conditions in both graphs are the same. Besides, here, the use of the secondary battery is started from the habitual use start time $T_{EF}$.

As shown in FIG. 5, in the charge apparatus of the general specifications, the charge is performed until the charge amount reaches the full charge amount $W_{100}$ from the charge start time without performing the temporary suspension. As a result of this, the temperature of the secondary battery continuously rises until a time a little before the charge amount reaches the full charge amount $W_{100}$ (until a heat generation amount due to the charge becomes smaller than a heat radiation amount) and reaches a temperature Te at a peak time.

On the other hand, as shown in FIG. 6, in the charge apparatus 9 according to the present embodiment, the charge is performed until the charge amount reaches the full charge amount $W_{100}$ from the charge start time while the temporary suspension (which pertains to a colored portion of FIG. 6) is performed every time the temperature of the secondary battery reaches the charge limit temperature $C_T$. As a result of this, the temperature of the secondary battery continuously decreases every time the temporary suspension is performed, and is limited to the charge limit temperature $C_T$ even at the peak time.

As described above, the temperature (especially the peak temperature) of the secondary battery during the time period when the charge is performed by the charge apparatus 9 according to the present embodiment is dramatically low compared with the temperature of the secondary battery during the time period when the charge is performed by the charge apparatus of the general specifications. Because of this, according to the charge apparatus 9 in the present embodiment, compared with the charge apparatus of the general specifications, it is possible to charge the secondary battery alleviating the deterioration.

Meanwhile, according to the charge apparatus 9 in the present embodiment, compared with the charge by the charge apparatus of the general specifications, the time when the secondary battery reaches the full charge amount is delayed. However, according to the charge apparatus 9 in the present embodiment, it is possible to charge the secondary battery to the full charge amount before the habitual use start time $T_{EF}$, besides, at a time point before the habitual use start time $T_{EF}$, the possibility that the use of the secondary battery is started is low. Because of this, even if the time when the secondary battery reaches the full charge amount is delayed as described above, a possibility of a situation where the secondary battery is not sufficiently charged by the next use time is low, and it is sayable that a major problem does not occur.

2. Second Embodiment

The charge apparatus 9 according to the first embodiment is able to be composed to charge secondary batteries for various uses such as a secondary battery used in a power source apparatus of a vehicle, a secondary battery used in a large-sized power storage battery, for example, and the like. Besides, it is possible to compose a power storage apparatus and a power source apparatus by using the secondary battery charged (e.g., a secondary battery used in a large-sized power storage battery) by the charge apparatus 9.

Figure 7:
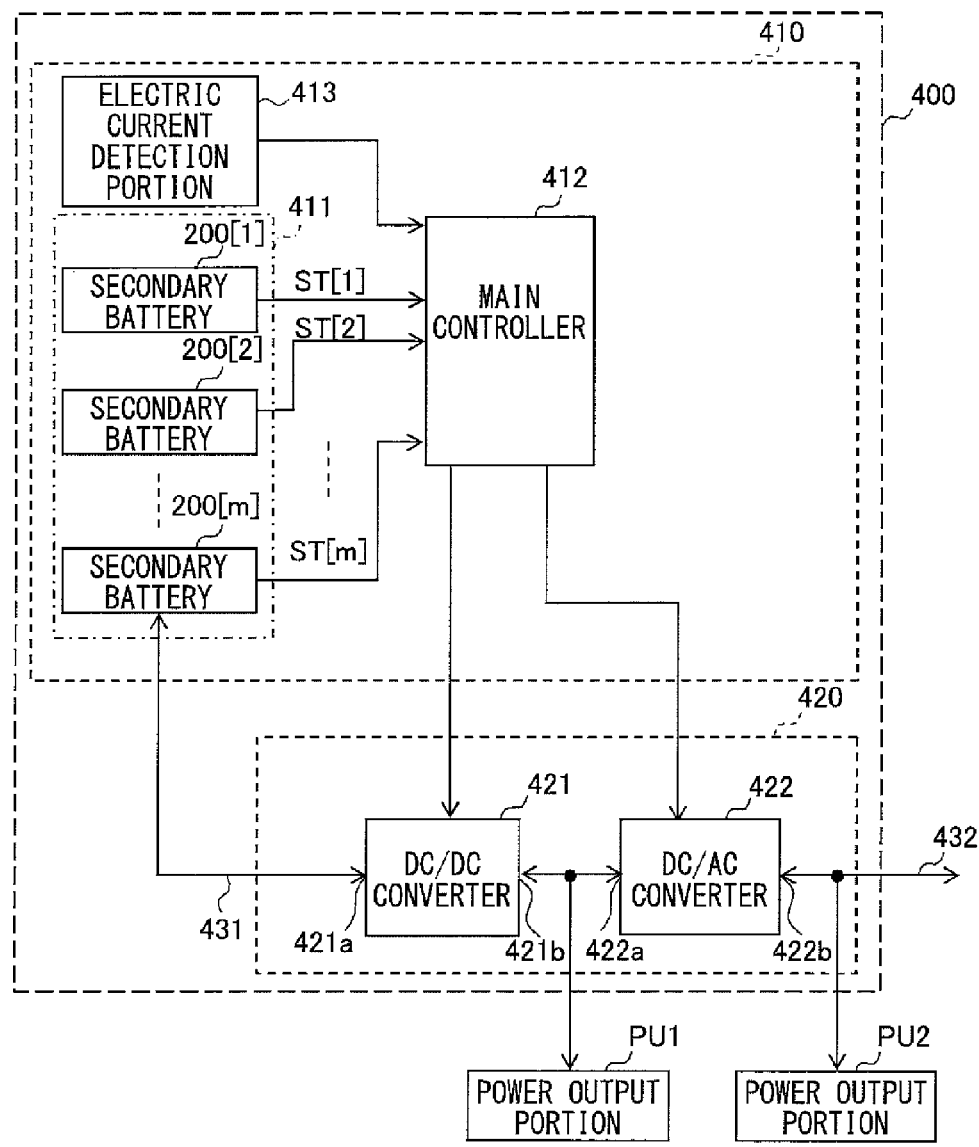
FIG. 7 is a block diagram showing a structure of a power source apparatus according to an embodiment of the present invention.

As a power storage apparatus and a power source apparatus according to a second embodiment of the present invention, apparatuses using the secondary battery charged by the charge apparatus 9 are described hereinafter. FIG. 7 is a block diagram showing a structure of a power source apparatus 400 according to the second embodiment. The power source apparatus 400 includes a power storage apparatus 410 and a power conversion apparatus (power conversion portion) 420. The power storage apparatus 410 includes: a battery unit 411 composed of a total of m secondary batteries 200 [1] to 200 [m] (there is a case of being called a "secondary battery 200"); a main controller 412; and an electric current detection portion 413. In the present embodiment, m is an integer that is 2 or larger. However, m may be 1.

Each of the secondary batteries 200 [1] to 200 [m] is the secondary battery charged by the charge apparatus 9 according to the first embodiment. Meanwhile, the secondary batteries 200 [1] to 200 [m] are respectively charged by the charge apparatuses 9 separate from one another, however, a structure may be employed, in which one charge apparatus 9 charges a plurality of the secondary batteries 200. Besides, a structure may be employed, in which one charge apparatus 9 charges all the secondary batteries 200 (i.e., the battery unit 411 is charged).

The secondary batteries 200 [1] to 200 [m] are connected in series or in parallel with one another. In the present example, the second batteries 200 [1] to 200 [m] are connected in series with one another. Of the second batteries 200 [1] to 200 [m], a negative electrode (negative output terminal) of a second battery having the lowest potential and a positive electrode (positive output terminal) of a second battery having the highest potential are connected to the power conversion apparatus 420 via a power line 431. The electric current detection portion 413 detects an electric current flowing in the power line 431, that is, a value of an electric current between the battery unit 411 and the power conversion apparatus 420, and outputs the detected electric current value to the main controller 412.

The power conversion apparatus 420 includes a DC/DC converter 421 and a DC/AC converter 422. The DC/DC converter 421 includes input/output terminals 421a and 421b, while the DC/AC converter 422 includes input/output terminals 422a and 422b. The input/output terminal 421a of the DC/DC converter 421 is connected to the battery system unit 411 via the power line 431. The input/output terminals 421b and 422a are connected to each other and to a power output portion PU1. The input/output terminal 422b is able to be connected to a power output portion PU2 and to a power system 432 that is a power system separate from the power source apparatus 400. Meanwhile, the connections between the power conversion apparatus 400 and the power output portion PU1 and between the power conversion apparatus 400 and the power output portion PU2 are not a must.

The power output portions PU1 and PU2 as examples of an external apparatus include an outlet. For example, various loads are connected to the power output portions PU1 and PU2. It may be conceived that each of the power output portions PU1 and PU2 is a load. The power system 432 includes a commercial power source or a solar battery. The solar battery is also connectable to the input/output terminal 421b, in this case, a d.c. voltage based on power generation by the solar battery is suppliable to the input/output terminal 421b. In a case of using a solar battery system including the solar battery and a power conditioner as the power system 432, an AC output portion (a.c. output portion) of the power conditioner is connectable to the input/output terminal 422b. Under control by the main controller 412, the power conversion apparatus 420 uses the DC/DC converter 421 and the DC/AC converter 422 to perform power conversion between the secondary batteries 200 [1] to 200 [m] and the power output portion PU1 and between the secondary batteries 200 [1] to 200 [m] and the power output portion PU2, or between the secondary batteries 200 [1] to 200 [m] and the power system 432.

Based on the detected electric current value by the electric current detection portion 413 and the like, the main controller 412 controls the DC/DC converter 421 and the DC/AC converter 422, thereby controlling a charge and a discharge of each of the secondary batteries 200 [1] to 200 [m]. However, the main controller 412 may control the charge only or the discharge only of each of the secondary batteries 200 [1] to 200 [m].

Besides, the main controller 412 may receive a signal (state signal ST), which is related to a state of the secondary battery and based on a detected value of an output voltage and the like, from each of the secondary batteries 200 [1] to 200 [m]. In other words, for example, an apparatus that generates the state signal ST for each of the secondary batteries 200 may be prepared and these apparatuses may send the state signal ST to the main controller 412. In this case, the main controller 412 receives each of the state signals [i] of the secondary batteries 200 [i] (where i is an integer of 1 to m).

The state signal ST includes, for example: a charge permission signal that indicates charge permission of the secondary battery 200; a charge prohibition signal that indicates charge prohibition of the secondary battery 200; a discharge permission signal that indicates discharge permission of the secondary battery 200; and a discharge prohibition signal that indicates discharge prohibition of the secondary battery 200. Besides, the state signal ST, when necessary, includes: a charge request signal that requests a charge of the secondary battery 200; and a discharge request signal that requests a discharge of the secondary battery 200.

And, the main controller 412 may control the charge and discharge (or either of them) of each of the secondary batteries 200 [1] to 200 [m] based on the state signal as well besides the detected electric current value by the electric current detection portion 413.

For example, in a case where each of the state signals ST [1] to ST [m] includes the discharge permission signal or the discharge request signal, under the control by the main controller 412, the DC/DC converter 421 converts output d.c. power from the battery unit 411 based on output power from the secondary batteries 200 [1] to 200 [m] into another d.c. power and outputs the other d.c. power from the input/output terminal 421b, while the DC/AC converter 422 converts d.c. power from the input/output terminal 421b into a.c. power and outputs the a.c. power from the input/output terminal 422b.

Or, in a case where each of the state signals ST [1] to ST [m] includes the charge permission signal or the charge request signal, for example, under the control by the main controller 412, the DC/AC converter 422 converts a.c. power from the power system 432 into d.c. power and outputs the d.c. power from the input/output terminal 422a, while the DC/DC converter 421 converts d.c. power from the input/output terminal 422a into another d.c. power and outputs the other d.c. power from the input/output terminal 421a. According to this, each of the secondary batteries 200 [1] to 200 [m] is charged by the d.c. power from the input/output terminal 421a.

In the above structure, the main controller 412 is an example of a charge/discharge control unit that performs the control of the charge and discharge of the secondary batteries 200 [1] to 200 [m]. Besides, the main controller 412 may have a function to detect the output voltage value from each of the secondary batteries 200; based on the detection result, may determine whether to charge or discharge the secondary battery 200, and control the power conversion apparatus 420 in accordance with the determination result.

Besides, unlike the structural example of FIG. 7, the power storage apparatus 410 and the power source apparatus 400 may be formed such that the battery unit 411 includes only one secondary battery 200 (e.g., the secondary battery 200 [1]).

The above power source apparatus 400 is able to be more advantageous to the use of the secondary battery 200 charged by the charge apparatus 9. For example, in the case where the power source apparatus 400 charges the secondary battery 200, it becomes possible to prevent more surely a charge amount shortage of the secondary battery 200. Besides, for example, in the case where the power source apparatus 400 discharges the secondary battery 200, the power accumulated in the secondary battery 200 is able to be used for more uses.

3. Others

As described above, the charge apparatus 9 includes: a function portion (estimation portion) that estimates the habitual use start time $T_{EF}$ of the secondary battery based on a use history of the secondary battery; a function portion (charge allowable time calculation portion) that calculates the time period from the secondary battery connection time $T_{SI}$ (charge start time of the secondary battery) to the nearest use start time $T_{EF}$ as the charge allowable time period Tα; a function portion (necessary charge time calculation portion) that calculates the charge time period necessary to fully charge the secondary battery as the necessary charge time period ΔT; and a function portion (charge execution portion) that charges the secondary battery under the usual charge condition when the charge allowable time period Tα does not exceed the necessary charge time period ΔT, and charges the secondary battery under the deterioration alleviation charge condition when the charge allowable time period Tα exceeds the necessary charge time period ΔT.

And, the deterioration alleviation charge condition is the charge condition that is used to perform the charge temporary suspension during the charge and charge the secondary battery such that the full charge is achieved within the charge allowable time period Tα. Because of this, according to the charge apparatus 9, it is possible to charge the secondary battery alleviating the deterioration and to avoid the situation, in which the secondary battery is not sufficiently charged by the next use time, as long as it is possible.

Besides, further, according to the charge apparatus 9, the habitual use start time of the secondary battery is estimated based on the use history of the secondary battery and based on the estimated result, the charge allowable time period and the like are calculated, accordingly, it is possible to perform the charge under the deterioration alleviation charge condition without imposing a burden on a user (without asking the user to input the use time and the like of the secondary battery).

Hereinbefore, the embodiments of the present invention are described, however, the present invention is not limited to these embodiments, and various modifications can be made without departing from the spirit of the present invention and put into practical use. Some modification examples are described hereinafter.

The charge target of the charge apparatus and charge method according to the present invention is not limited to a lithium-ion battery and is applicable to general secondary batteries that have a risk of preservation deterioration. Besides, the secondary battery, which is the charge target of the charge apparatus and charge method according to the present invention, is not limited to a secondary battery for a vehicle.

Besides, in the above embodiments, the charge characteristic indicating the relationship between the charge time period and the charge amount of the secondary battery is stored in the memory included in the battery pack, however, the charge characteristic indicating the relationship between the charge time period and the charge amount of the secondary battery that is the charge target may be stored in the charge apparatus beforehand.

Besides, the charge characteristic indicating the relationship between the charge time period and the charge amount of the secondary battery changes with the use of the secondary battery, accordingly, the charge apparatus according to the present invention may have a learning function for the change in the charge characteristic. For example, in accordance with the use history of the secondary battery, the stored content about the charge characteristic may be rewritten or the stored charge characteristic may be corrected and used.

INDUSTRIAL APPLICABILITY

The present invention is applicable to a charge apparatus that charges a secondary battery.

REFERENCE SIGNS LIST 1 drive time record portion
2 habitual use start time estimation portion
3 secondary battery connection time acquisition portion
4 charge condition set portion
5 charge portion
9 charge apparatus
200 secondary battery
400 power source apparatus
410 power storage apparatus
411 battery unit
412 main controller
413 electric current detection portion
420 power conversion apparatus
421 DC/DC converter
422 DC/AC converter
431 power line
432 power system

What is claimed is:

1. A charge apparatus that charges a secondary battery, the charge apparatus comprising:
an estimation portion that estimates a use start time of the secondary battery based on a use history of the secondary battery;
a charge condition set portion configured to:
calculate a time period from a charge start time of the secondary battery to a nearest use start time as a charge allowable time period; and
calculate a necessary charge time period necessary to fully charge the secondary battery; and
a charge portion that performs a temporary suspension of the charge during the charge and charges the secondary battery such that the secondary battery is fully charged within the charge allowable time period when the charge allowable time period exceeds the necessary charge time period.

2. The charge apparatus according to claim 1, further comprising a temperature detection portion that detects a temperature of the secondary battery, wherein
when the detected temperature reaches a threshold value set beforehand, the temporary suspension is performed.

3. The charge apparatus according to claim 2, wherein the threshold value is set in accordance with a difference between the charge allowable time period and the necessary charge time period.

4. The charge apparatus according to claim 2, wherein a sum of periods of the temporary suspensions of the charge is set not to exceed a difference between the charge allowable time period and the necessary charge time period.

5. The charge apparatus according to claim 1, wherein the secondary battery is a battery that is mounted in a car.

6. The charge apparatus according to claim 5, wherein the estimation portion accumulates information of the use history based on a state of an ignition key of the car, a state of a car navigation system mounted in the car, and a residual amount of the secondary battery.

7. A power storage apparatus comprising:
the secondary battery that is charged by the charge apparatus according to claim 1; and
a charge/discharge control unit that performs control of a charge or a discharge of the secondary battery.

8. A power source apparatus comprising:
the power storage apparatus according to claim 7; and
a power conversion apparatus that performs power conversion between the secondary batter and an external apparatus or between the secondary battery and a power system under control by the charge/discharge control unit, wherein
the power source apparatus is connectable to the external apparatus or the power system.

* * * * *